Jan. 28, 1936.   G. N. EDWARDS   2,029,064
CARCASS SCRAPER
Filed Nov. 17, 1934
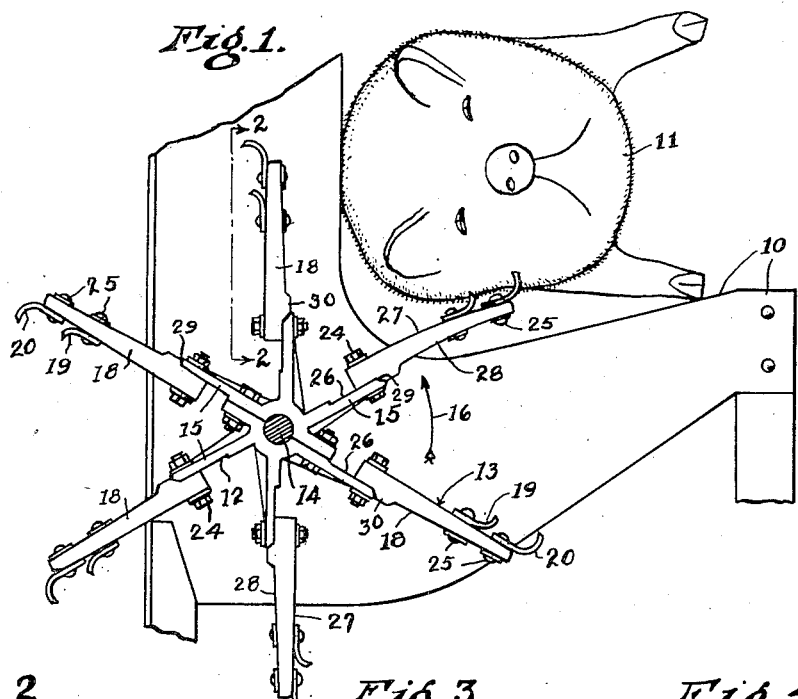
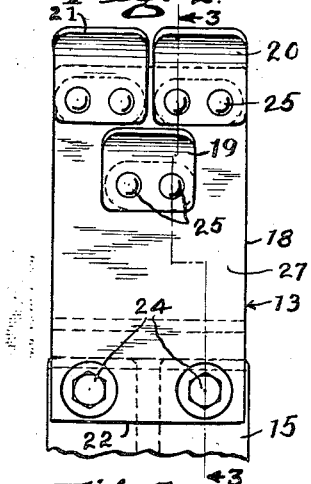
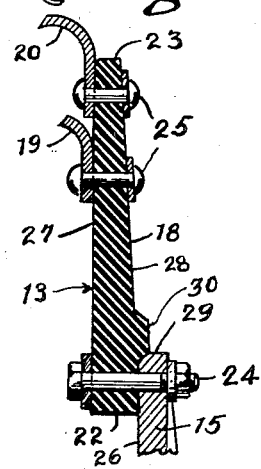
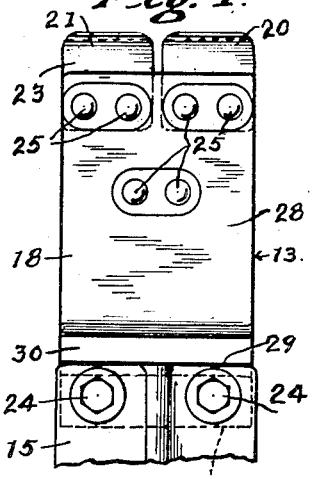
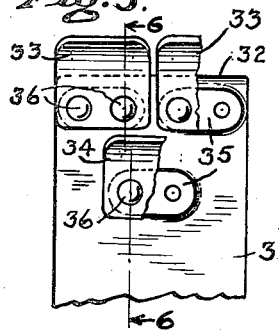
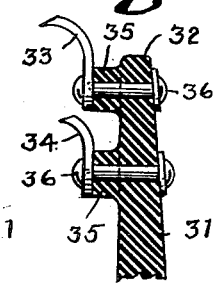
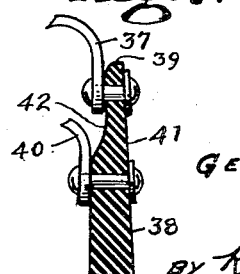
INVENTOR.
GEORGE N. EDWARDS.
By Kwis Hudson + Kent
ATTORNEYS.

Patented Jan. 28, 1936

2,029,064

UNITED STATES PATENT OFFICE 2,029,064

CARCASS SCRAPER

George N. Edwards, Willoughby, Ohio, assignor to The Ohio Rubber Company, Willoughby, Ohio, a corporation of Ohio Application November 17, 1934, Serial No. 753,494

7 Claims. (Cl. 17—18)

This invention relates to apparatus for dehairing and cleaning the skins and carcasses of animals and, more particularly, to an improved mounting for the scraper blades forming a part of such apparatus.

An object of the present invention is to provide improved apparatus, of the type referred to, embodying a scraper blade mounting having the desired degree of flexibility for efficient operation of the scraper blades but which is of very durable construction.

Another object of the invention is to provide an improved scraper blade mount comprising a resiliently flexible member which is so formed that the flexing of the member is distributed substantially uniformly therealong during use of the scraper.

Still another object of the invention is to provide a scraper mount, of the type referred to, comprising an elongated slab of resiliently flexible material which is of diminishing thickness toward the scraper blades with the taper on the compression side of the slab.

A further object of the invention is to provide an improved scraper, of the type referred to, including a resiliently flexible member forming a mount for the scraper blades which mount is sufficiently flexible to permit the blades to adapt themselves to the contour of the article being scraped but wherein the flexing of the member is controlled and distributed so as to prevent untimely breakage thereof at any given point.

Other objects and advantages of the invention will be apparent from the following description and the accompanying drawing, wherein Fig. 1 is an elevational view showing a carcass dehairing machine embodying my improved scraper;

Fig. 2 is a top plan view of my improved scraper;

Fig. 3 is a sectional view taken through the scraper as indicated by line 3—3 of Fig. 2;

Fig. 4 is a bottom plan view of the scraper;

Fig. 5 is a plan view, with parts broken away, showing a modified form of my improved scraper;

Fig. 6 is a sectional view thereof taken on line 6—6 of Fig. 5; and

Fig. 7 is a partial sectional view similar to that of Fig. 6 but showing still another form of my improved scraper.

In the accompanying drawing, to which detailed reference will now be made, I have shown my improved scraper for dehairing and cleaning the carcasses of animals and, while I have illustrated what I now regard to be the preferred forms of my invention, it should be understood that these are to be regarded as illustrative only and that the invention may be embodied in various other devices and constructions.

In Fig. 1 of the drawing, I have represented one form of dehairing apparatus in which the improved scraper of my invention may be embodied. This apparatus includes a gratelike table or support 10, upon which the carcass 11 of a hog or other animal to be scraped may be supported, and one or more star wheels or spiders 12, which carry the scrapers 13 and cause the latter to operate on the carcass. The star wheels 12 may be rotated by being secured to a drive shaft 14 which may be rotated by any suitable power means.

The star wheel may be of any appropriate form of construction, such as that shown in the drawing, wherein the wheel comprises sections which are bolted together and thereby secured to the shaft with the arms 15 extending substantially radially outwardly from the shaft. In this instance, the star wheel is shown as having six such arms and a corresponding number of the scrapers 13 but provision may be made for any desired number of scrapers.

In the operation of the dehairing apparatus shown in Fig. 1, the star wheel 12 is rotated in the direction indicated by the arrow 16, thereby causing the scrapers 13 to be brought up into engagement with the underside of the carcass 11 in succession and to be drawn across the surface of the skin of the carcass to scrape hair and foreign material therefrom. During this operation the carcass is partially lifted and is rolled over and over by the action of the scrapers so that substantially all parts of the carcass are reached by the scrapers.

As will be explained more fully hereinafter, my improved scraper is provided with a resiliently flexible member 18 which is secured to one of the arms 15 of the star wheel so as to extend therebeyond, and a plurality of scraper blades 19, 20 and 21 which are mounted on the extending portion of the flexible member. During use of the dehairing apparatus shown in Fig. 1, the members 18 which form the mounts for the scraper blades are bowed or deflected during the scraping action. That is to say, the scraping force with which the blades are pressed against the carcass 11 is transmitted through the flexible member 18 and the flexing of this member prevents the blades from digging or cutting into the skin of the carcass. The flexibility of this member also allows the blades to be shifted or tilted relative to each other so that they may adapt themselves to the contour of the carcass being scraped.

Flexible supports for scraper blades have been used heretofore in dehairing apparatus of the type mentioned above, but have been found to be unsatisfactory and unreliable because they did not possess the requisite flexibility and durability, and required frequent replacement. When these flexible mounts were constructed with sufficient stiffness to cause the scraper blades to perform the desired scraping action, the mounts were subject to breakage at a point near the connection with the arm of the star wheel, and when these mounts were constructed so as to provide increased flexibility to avoid such breakage they did not furnish the necessary scraping pressure and they often assumed a permanent curvature or set which likewise prevented the scraper blades from properly performing their intended function.

To overcome these difficulties and to provide a scraper blade mount having the desired resiliency necessary to a proper functioning of the scraper blades and yet which will be durable and therefore economical in use, I have devised the resilient scraper blade mount of the peculiar shape shown in the drawing, which will now be described more in detail.

The scraper blade mount 18 comprises a slab of soft vulcanized rubber or rubberlike material. The proper composition for the rubber may be determined by experimentation but the mount formed by the slab should be of a resilient and springy nature so that the scraper blades will be yieldingly pressed against the carcass. As best shown in Fig. 3 of the drawing, the slab 18 is constructed with the inner end or base 22 thereof thicker than its outer end 23 and with the thickness of the slab diminishing toward the outer end adjacent which the scraper blades 19, 20 and 21 are mounted. The relatively thicker inner end 22 may be secured to the arm 15 of the star wheel by suitable bolts 24 extending through openings provided in the arm and in the slab. The scraper blades 19, 20 and 21, which are preferably curved cliplike metal members, may be secured to the outer end 23 of the slab by suitable fastening members, such as rivets 25, which extend through the blades and through the slab.

It will be observed from the arrangement illustrated in Figs. 1 and 3, that the slab 18 is arranged on the leading face 26 of the arm 15 and that the scraper blades are mounted against the leading face 27 of the slab. It will be seen further that with this arrangement and with the direction of rotation indicated by the arrow 16, the scraping force will tend to press the slab against the arm 15 and to press the scraper blades against the slab and the tearing of the flexible material of which the slab is constructed will thus be avoided. Furthermore, it will be noted that when the slab 18 is deflected by the scraping force being transmitted to the blades, the face 27 of the slab is the tensile face or side and the side 28 is the compression side. In other words, when the slab is deflected during the scraping action the material at or adjacent the side 27 is in tension and the material at or adjacent the side 28 is in compression.

As mentioned above, the slab 18 is of diminishing thickness toward its outer end 23, and this is an important feature of my invention because by this means I am able to distribute the flexing of the slab along its length. I also construct this member with the taper on the side 28 thereof, which is the compression side. In giving the slab a progressively varying thickness and providing the taper on the compression side of the slab, I am able to regulate the flexure of the slab in such a way that the total deflection of the slab by the scraping force will be distributed substantially uniformly along the slab, as indicated in Fig. 1, and no part of the slab will be subjected to a greater degree of flexing or working than any other part of the slab. By thus distributing the flexing substantially uniformly along the slab, it will be seen that the material of all portions of the slab are subjected to substantially the same flexure and stresses and hence all parts of the slab will wear at the same rate and maximum durability will thus be obtained.

Because of the leverage caused by the extended mount of the scraper blades, there would ordinarily be a tendency for the slab 18 to be sharply deflected or bent over the outer edge or corner 29 of the arm 15 of the star wheel, which would result in increased flexure and consequent early failure of the material adjacent the base or inner end of the slab. To prevent this and to assist in obtaining the desired substantially uniform distribution of the flexing of the slab, I provide a transverse rib or lug 30 immediately adjacent the edge 29 of the supporting arm, as shown in Figs. 3 and 4. This transverse rib is formed integral with the body of the slab and increases the stiffness of the slab adjacent the connection of the same with the supporting arm so that the flexing of the slab will take place substantially uniformly therealong. This transverse rib also serves as a means for locating the slab on the supporting arm. The rib may be of any desired cross-sectional shape, but is preferably beveled as shown in Fig. 3.

As a further feature of my invention, I have provided a means for obtaining increased tilting movement of the scraper blades where that may be found desirable. To obtain such increased tilting of the blades, I provide a flexible scraper member 31, generally similar to that of Figs. 2 and 3, but which is provided adjacent the outer end 32 thereof with an increased body of flexible material forming mounts for the scraper blades 33 and 34. This increased body of flexible material may be provided in the form of upstanding lugs 35 which are formed integral with the body of the slab. Each of the lugs 35 forms a seat against which one of the scrape blades may be held by rivets 36 or other fastening members.

The lugs 35 may be formed of the same rubber composition as the body of the slab 31 or, if desired, may be formed of a more yielding composition if greater tilting movement of the scraper blades should be desired. During use of the scraper shown in Figs. 5 and 6, the increased body of flexible material contained in the mount for the scraper blades allows tilting of the blades relative to each other and relative to the slab 31, which permits the scraper blades to adapt themselves to the contour of the carcass or article being scraped.

In Fig. 7 of the drawing, I have shown further means for obtaining increased tilting or flexing of the outermost scraper blades 37. This means consists in providing the slab 38 with an outer end portion 39 of reduced thickness as compared with the thickness of the portion of the slab upon which the blade 40 is mounted. The flexibility of the outer end portion 39 of the slab may be further increased by decreasing the thickness of the material connecting the outer portion 39 with the slab proper as indicated at 41. Such decreased thickness at this point may be obtained by providing the tension side of the slab with a transverse groove or recess 42 extending preferably the full distance across this space of the slab.

From the foregoing description and the accompanying drawing, it should now be readily understood that I have provided an improved scraper for use in dehairing the skins and carcasses of animals, wherein the scraper blades are carried by a flexible mount of such construction that the flexing is distributed substantially uniformly along the mount. Such uniformly distributed flexing prevents certain parts of the material from being stressed and worked more than others and hence provides for maximum durability of the scrapers.

While I have illustrated and described the improved scraper of my invention in a somewhat detailed manner, it will be understood of course that I do not wish to be limited to the precise details of construction and arrangements of parts illustrated and described, but regard my invention as including such changes and modifications as do not involve a departure from the spirit of the invention and the scope of the appended claims.

Having thus described my invention, I claim:

1. A carcass scraper comprising a support, an elongated resiliently flexible body connected with said support and having a portion thereof extending beyond the support, and a scraper blade on the extending portion of the body, said body having a substantially continuous uniform taper progressively varying the thickness therefor and being thickest adjacent the connection with said support whereby deflection of the body during use of the scraper is distributed over a substantial portion of the length of the body.

2. A carcass scraper comprising a support, an elongated slab of soft vulcanized rubber having one end thereof connected with said support with a substantial portion of the slab extending beyond the support, and a scraper blade on said slab adjacent its outer end, said slab being thickest adjacent the connection with said support and having a substantially uniform taper extending continuously between said connection and said outer end whereby the flexing of the slab during use of the scraper is distributed over a substantial portion of the length of the slab.

3. A carcass scraper comprising a movable support, a resiliently flexible member connected with said support and extending therefrom, and a scraper blade on the extending portion of said member, said blade being adapted to be brought into scraping engagement with a body to be scraped by movement of said support in a direction to cause one side of said member to be subjected to tension and its other side to be subjected to compression, said member being formed with the compression side thereof continuously and substantially uniformly tapered whereby the deflection of said member is distributed therealong.

4. A carcass scraper comprising a support, a resiliently flexible member connected with said support and having a substantial portion thereof extending beyond the support, a scraper blade on the extending portion of said member adapted to engage a body to be scraped with pressure supplied through said member, said member being thickest adjacent its connection with said support and having on the compression side thereof a transversely extending integral reinforcing part immediately adjacent the edge of said support and said member also having on the compression side thereof a substantially uniform taper extending continuously between said transverse reenforcing part and said scraper blade.

5. A carcass scraper comprising a support, a resiliently flexible member connected with said support and having a substantial portion thereof extending beyond the support, a scraper blade on the extending portion of said member adapted to engage a body to be scraped with pressure supplied through the member, said member being thickest adjacent said connection and tapering in thickness toward its free end with the taper on its compression side, said member also having on the compression side thereof a transversely extending integral reinforcing part immediately adjacent the edge of said support.

6. A scraping device comprising a support, a member of resiliently flexible material connected to said support and extending therebeyond, said member having means on the extending portion thereof providing an increased body of flexible material forming a yieldable mount, and a scraper blade on said mount adaptable substantially to the surface contour of an object to be scraped by yielding of the mount.

7. A scraping device comprising a support, an elongated slab of resiliently flexible material having one end thereof connected to said support, and a scraper blade adjacent the free end of said slab engageable with an object to be scraped with pressure transmitted through the slab, said slab being provided on the tensile side thereof and adjacent its free end with an increased body of said flexible material forming a yieldable mount for said scraper blade whereby the latter is adaptable substantially to the surface contour of said object, said slab also being tapered toward its free end with the taper on its compression side whereby flexure of the slab is distributed therealong.

GEORGE N. EDWARDS.